United States Patent
Bartucca et al.

(10) Patent No.: US 7,581,138 B2
(45) Date of Patent: Aug. 25, 2009

(54) METHOD, SYSTEM AND COMPUTER PROGRAM FOR MANAGING TEST PROCESSES BASED ON CUSTOMIZED UML DIAGRAMS

(75) Inventors: Giovanni Bartucca, Rome (IT);
Agostino Colussi, Rome (IT);
Emmanuele Tordelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/538,575

(22) Filed: Oct. 4, 2006

(65) Prior Publication Data
US 2007/0094542 A1    Apr. 26, 2007

(30) Foreign Application Priority Data
Oct. 24, 2005    (EP)    ................................ 05109898

(51) Int. Cl.
*G06F 11/00*    (2006.01)
(52) U.S. Cl. ............................................. 714/25; 718/1
(58) Field of Classification Search ................ 714/25, 714/37, 38, 47; 718/1, 100, 102, 103

See application file for complete search history.

(56) References Cited

U.S. PATENT DOCUMENTS

| | | | |
|---|---|---|---|
| 7,398,515 B2 * | 7/2008 | Atoji et al. | 717/126 |
| 2006/0235732 A1 * | 10/2006 | Miller et al. | 705/7 |
| 2006/0277081 A1 * | 12/2006 | Pham et al. | 705/7 |
| 2007/0174361 A1 * | 7/2007 | Branda et al. | 707/204 |
| 2007/0299717 A1 * | 12/2007 | Yamamoto et al. | 705/10 |

* cited by examiner

*Primary Examiner*—Dieu-Minh Le
(74) *Attorney, Agent, or Firm*—Jeffrey S LaBaw

(57) ABSTRACT

A method for facilitating the management of a test process is proposed. For this purpose, the different test scenarios included in the process and their execution dependencies are represented by means of a customized UML activity diagram (300a). An execution weight is also associated with each test scenario (for example, defined by the man-hours required for its execution). In this way, it is possible to identify critical test scenarios (315g), which may impair the execution of the whole test process when they fail (because many other test scenarios depend on their successful completion). The order of execution of the test scenarios is then arranged into a test plan, so as to minimize the time required to reach the critical test scenarios. Preferably, the same process is repeated whenever any runtime condition changes (such when a test scenario fails).

10 Claims, 11 Drawing Sheets

METHOD, SYSTEM AND COMPUTER PROGRAM FOR MANAGING TEST PROCESSES BASED ON CUSTOMIZED UML DIAGRAMS

FIELD OF THE INVENTION

The present invention relates to the information technology field. More specifically, the present invention relates to the management of activities (such as in test processes).

BACKGROUND ART

The test of software applications (to verify their correctness, completeness and quality) is a very critical process. The problem is particular acute in large software applications, especially with distributed architecture. Moreover, the complexity of the test process strongly increases when the software applications are intended to run in heterogeneous network environments, or when they have multi-tier structures (as typical of modern web applications).

The definition of a generic test process commonly requires the specification of a number of test scenarios, each one for verifying a selected feature (for example, consisting of a set of test cases relating to a component of the software application). A manager (such as a team-leader) in charge of the test process must define the test scenarios and then design a strategy for their execution; particularly, this involves the allocation of the available resources (such as human testers) to the required activities.

The management of the test process is nowadays a substantial manual task. Indeed, although some tools are available for automating the execution of specific operations, all the activities relating to the development, planning, scheduling and reporting of the test process still remain in charge of the team-leader. Typically, the above-mentioned activities are based on an investigation process, which requires a heavy human intervention.

Particularly, the definition of an execution strategy for the test scenarios strongly depends on the skill of the team-leader; in any case, the obtained results are not repeatable and prone to errors.

Moreover, the documentation of any phase of the test process remains based on a specification in prose. Therefore, this makes it very difficult to convey and/or share the desired information; moreover, it is almost impossible to perform any objective analysis of the test process.

The above-mentioned drawbacks also have a detrimental impact on the optimal allocation of the testers. Indeed, it is very difficult (if not impossible) for the team-leader to decide how to exploit the testers so as to ensure an effective execution of the test process.

All of the above adversely affects the cost and the quality of the test process; this hinders the extensive application of the test process, with a negative repercussion on the reliability of the software applications.

SUMMARY OF THE INVENTION

According to the present invention, the idea of identifying critical test scenarios is proposed.

Particularly, an aspect of the invention provides a method for facilitating the management of a test process (including a plurality of test scenarios); predefined resources are available for executing the test scenarios. The method starts with the step of defining execution dependencies among the test scenarios (based on successful completion thereof). A blocking weight of each test scenario is then determined, according to the test scenarios depending thereon. It is now possible to identify a set of critical test scenarios (one or more) having the highest blocking weights. A test plan is then generated by arranging the order of execution of the test scenarios by the available resources, so as to minimize a cost function for the reaching of the critical test scenarios (according to the available resources and the execution dependencies). At the end, the method causes the execution of the test scenarios (by the available resources) according to the test plan.

In a preferred embodiment of the invention, a new test plan is generate in response to any change in runtime conditions (which may affect the execution of the test scenarios).

Typically, the runtime conditions include a status of the test scenarios.

In an embodiment of the invention, the cost function indicates the time required to reach the critical test scenarios.

Advantageously, each test plan is further generated according to execution weights associated with the test scenarios.

Preferably, the execution dependencies are represented with a diagram (including different graphical elements for the test scenarios, their execution dependencies and alternatives).

Preferably, the desired result is achieved by means of a (customized) UML diagram.

A way to further improve the solution is of assigning a priority for fixing any detected execution error, according to the blocking weight of the corresponding test scenario that has failed.

Another aspect of the invention proposes a computer program for performing this method.

A further aspect of the invention proposes a corresponding system.

The characterizing features of the present invention are set forth in the appended claims. The invention itself, however, as well as further features and the advantages thereof will be best understood by reference to the following detailed description, given purely by way of a non-restrictive indication, to be read in conjunction with the accompanying drawings

DETAILED DESCRIPTION

Figure 1:
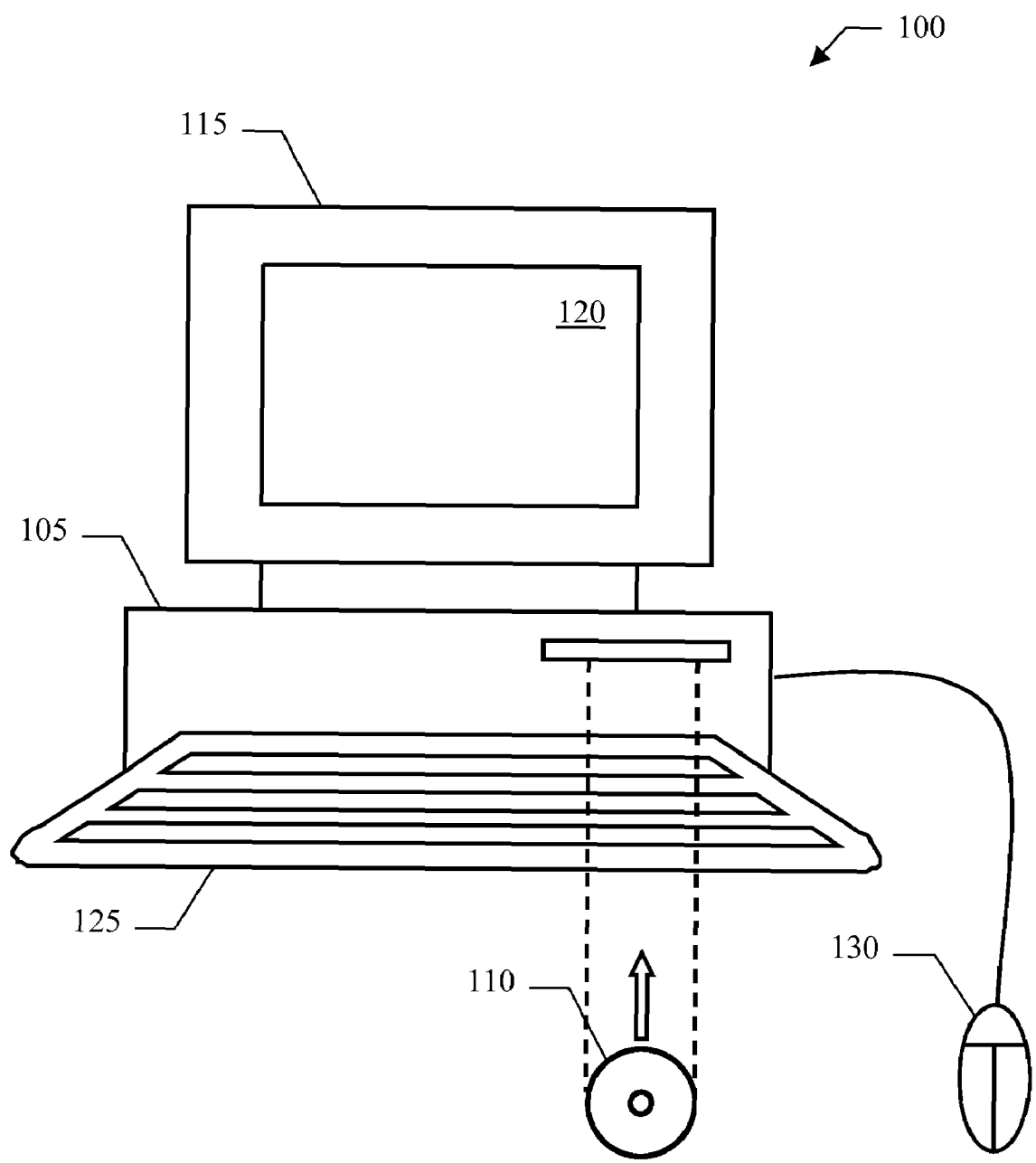
FIG. 1 is a pictorial representation of a computer in which the solution according to an embodiment of the invention can be implemented.

With reference in particular to FIG. 1, a computer 100 (for example, a PC) is shown. The computer 100 includes a central unit 105, which houses the electronic circuits controlling its operation (such as a microprocessor and a working memory). The computer 100 is also provided with a hard-disk and a drive for CD-ROMs 110. A monitor 115 is used to display images on a screen 120. Operation of the computer 100 is controlled by means of a keyboard 125 and a mouse 130, which are connected to the central unit 105 in a conventional manner. The above-described computer 100 may be used to test computer programs (and especially large software applications). Particularly, the test process is carried out at the level of each component of the software application (so as to implement a so called Component Verification Test, or CVT). The test of each software component includes multiple test scenarios. Each test scenario verifies the correct behavior of a selected feature of the software component by executing a set of test cases (commonly referred to as a bucket); each test case consists of a sequence of instructions, which specifies the execution of desired operations and the corresponding expected results.

In the solution according to an embodiment of the invention, the test process is represented with a UML diagram. The UML is a standard language, which is used to model software applications (especially of the object-oriented type); the models are commonly used during the development of the software applications to obtain abstractions, which provide a simplified representation of the corresponding real artifacts to be built. Each model may be represented graphically through a number of diagrams (which syntax and underlying semantic are defined by the UML language).

Figure 2:
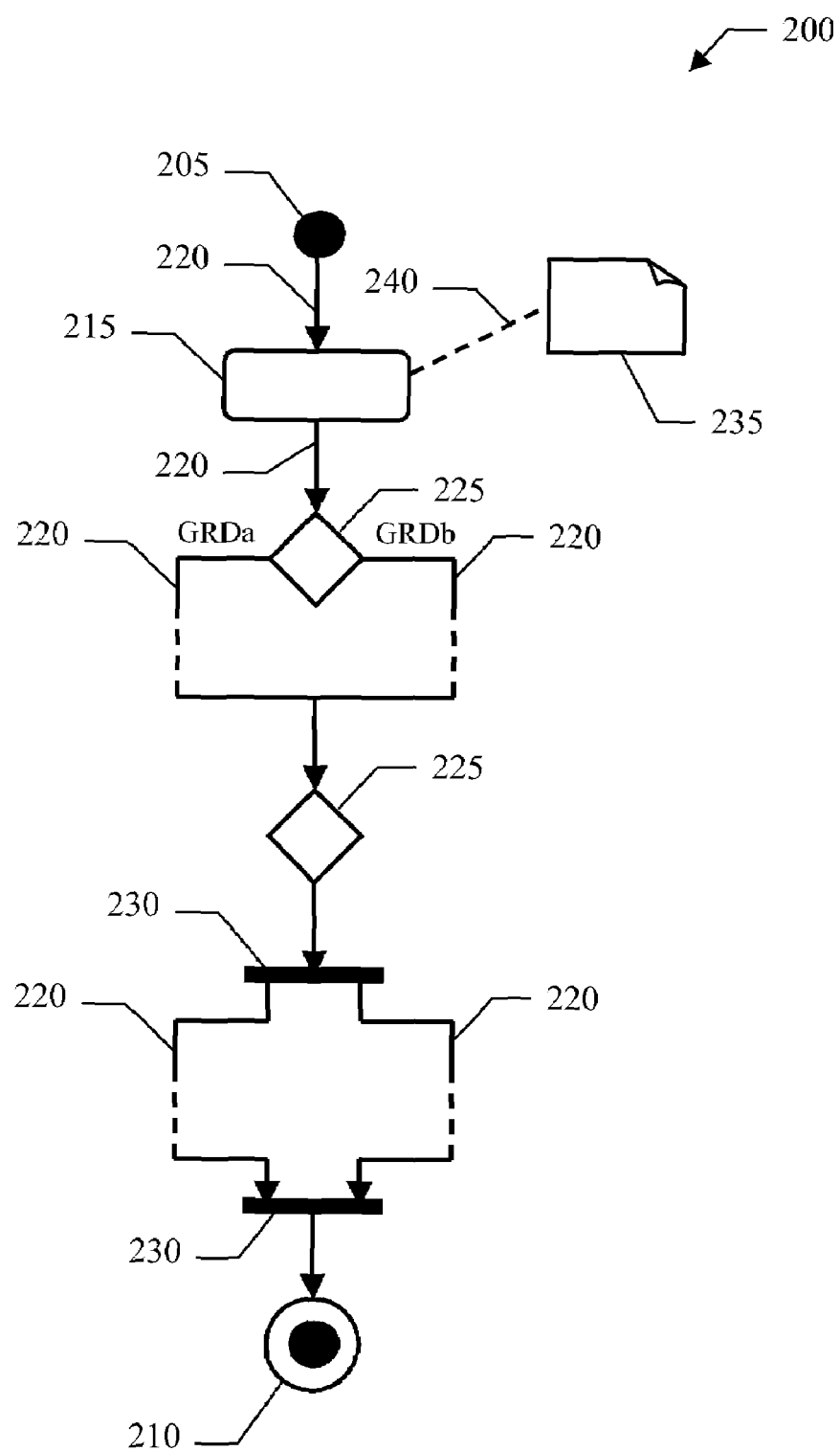
FIG. 2 depicts the main graphical elements of a standard activity diagram.

Particularly, activity diagrams are used to represent the sequence of activities involved by a generic process. Each activity diagram is built by using standard graphical elements. For example, as shown in FIG. 2, a generic activity diagram 200 always includes a (pseudo) initial state 205 (represented by a black circle), which establishes the start of the process; a final state 210 (represented by two concentric white/black circles) instead establishes the end of the process. An action state 215 (represented by a rounded rectangle) defines the execution of an atomic operation; a transition 220 (represented by an arrow) indicates the passage from a (source) action state 215 to a (target) action state 215, when the operations associated with the source action state 215 have been completed. A decision point 225 (represented by a hollow diamond) is used to branch the flow of activity into two or more mutual exclusive (output) transitions 220 and then to merge them at the completion of the corresponding operations; each output transition 220 coming out of the decision point 225 is labeled with a different guard condition (denoted with GRDa and GRDb in the example at issue). On the other end, a synchronization point 230 (represented by a solid bar) is used to fork the flow of activity into two or more concurrent (output) transitions 220, and to joint them at the completion of the corresponding operations. A note 235 (represented by a rectangle with a folded edge) may also be inserted to comment any graphical element of the activity diagram 200 (without altering its meaning); the note 235 is linked to the corresponding graphical element by means of an anchor 240 (represented by a dashed line).

In the proposed solution, the meaning of the activity diagrams is slightly modified to represent the test processes. Particularly, the initial state 205 and the final state 210 maintain their functions. Conversely, the action state 215 now represents the execution of a specific test scenario. The transition 220 instead represents a single execution dependency, wherein a (target) test scenario associated with the target action state 215 depends on a (source) test scenario associated with the source action state 215; in this case, the target test scenario can be executed only after the source test scenario has been successfully completed. The decision point 225 is now used to represent an alternative based on a decision taken at runtime (during the execution of the test process); in this phase, it is possible to follow one or even more of the output transitions 220 (coming out of the decision point 225) according to the contingent situation. On the other end, the synchronization point 230 is used to joint two or more concurrent (input) transitions 220 into a single (output) transition 220. The synchronization point 230 then represents a multiple execution dependency, wherein a (target) test scenario associated with the target action state 215 of the output transition 220 depends on the (source) test scenarios associated with the source action states 215 of the input transitions 220; in this case, the target test scenario can be executed only after all the source test scenarios have been successfully completed. At the end, the note 235 instead identifies a critical test scenario.

The critical test scenarios are defined as those test scenarios that may impair the execution of the whole test process when they fail; this occurs when one or more errors in the software component under test are identified during the execution of each test scenario (so as to prevent its continuation). In order to identify those critical test scenarios, an execution weight is assigned to each test scenario; for example, the execution weight is defined by points representing the number of man-hours required to complete the execution of the test scenario. For each test scenario, a blocking weight can be calculated as the sum of the execution weights of all the test scenarios that cannot be executed should the test scenario fail (and then remain blocked up to its successful completion); therefore, the blocking weight is obtained from the execution weight of the test scenario at issue plus the execution weights of all the test scenarios that depend exclusively on it either directly or indirectly (and then cannot be reached from any other test scenarios). The test scenarios with the highest blocking weights are set as critical. For example, the critical test scenarios are those having the blocking weights that exceed a threshold value; typically, the threshold value is set to a predefined percentage of the highest blocking weight (such as 60-90%).

Figure 3A:
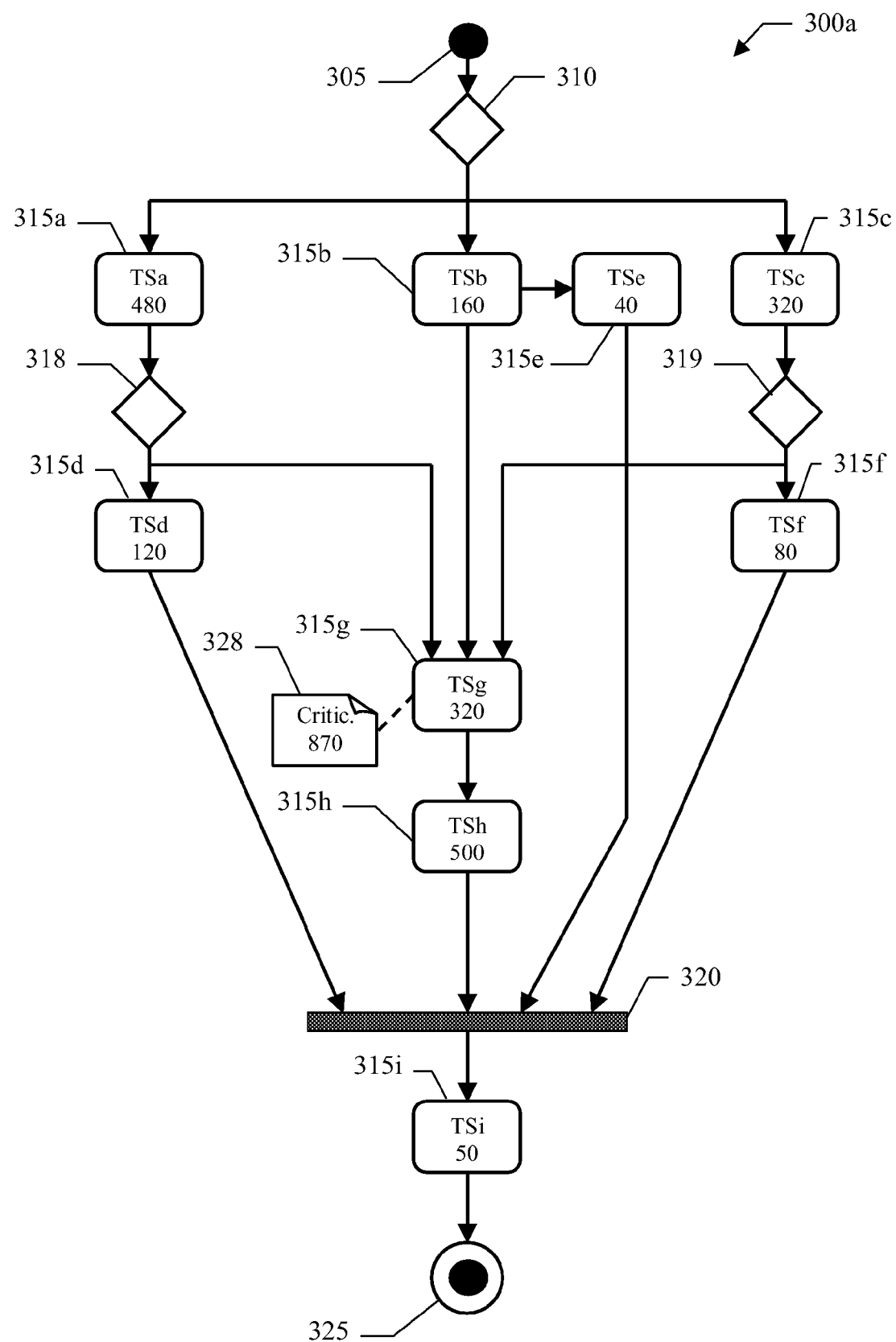
FIGS. 3*a*-3*f* illustrate exemplary applications of the solution according to different embodiments of the invention.

The above-described solution provides a powerful formalism for representing and analyzing the test process, and especially for facilitating the identification of the critical test scenarios. For example, as shown in FIG. 3a, a very simple test process is represented with an (original) activity diagram 300a. Starting from an initial state 305, the test process then passes to a decision point 310. Three different action states 315a, 315b and 315c can be reached from the decision point 310. This means that the corresponding test scenarios (denoted with TSa, TSb and TSc, respectively) can be executed without any constraint; in other words, it is possible to execute any one of the test scenarios TSa-TSc, or even more of them at the same time. The action states 315a, 315b and 315c are followed by further action states 315d, 315e and 315f, respectively. Therefore, the test scenarios associated with the action states 315d, 315e and 315f (denoted with TSd, TSe and TSf) depend on the test scenarios TSa, TSb and TSc, respectively; in other words, the test scenarios TSd, TSe and TSf can be executed only after the test scenarios TSa, TSb and TSc, respectively, have been successfully completed. At the same time, another action state 315g can be reached from the action state 315b (as indicated by a corresponding transition); the action state 315g can also be reached from the action states 315a or 315c (in addition or in alternative to the action states 315d and 315f, respectively), as indicated by corresponding decision points 318 and 319 with the associated transitions. This means that the test scenario associated with the action state 315g (denoted with TSg) can be executed as soon as one of the test scenarios TSa, TSb and TSc has been successfully completed. Moreover, a transition indicates the passage from the action state 315g to a further action state 315h; as a result, the test scenario associated with the action state 315h (denoted with TSh) depends on the test scenario TSg. A synchronization point 320 is reached from the action states 315d, 315e, 315f and 315h. A further action state 315i follows the synchronization point 320. This means that the test scenario associated with the action state 315*i* (denoted with TSi) can be executed only when all the test scenarios TSd, TSe, TSf and TSh have been successfully completed; for example, even if the test scenarios TSd, TSe and TSf have been successfully completed, it is necessary to wait for the successful completion of the test scenario TSh before proceeding to the test scenario TSi. At the end, a transition indicates the passage from the action state 315*i* to a final state 325.

The test scenarios TSa-TSi have the following execution weights:
- TSa=480
- TSb=160
- TSc=320
- TSd=120
- TSe=40
- TSf=80
- TSg=320
- TSh=500
- TSi=50.

It is then possible to calculate the blocking weights of the same test scenarios TSa-TSi as:
- TSa=480+120+50=650
- TSb=160+40+50=250
- TSc=320+80+50=450
- TSd=120+50=170
- TSe=40+50=90
- TSf=80+50=130
- TSg=320+500+50=870
- TSh=500+50=550
- TSi=50.

The test scenarios TSa-TSi are arranged along a sequence in decreasing order of their blocking weights:
- TSg=870
- TSa=650
- TSh=550
- TSc=450
- TSb=250
- TSd=170
- TSf=130
- TSe=90
- TSi=50.

Therefore, the test scenario TSg is the most critical in the test process; this is indicated by a note 328, which is then linked to the corresponding action state 315*g* (for example, with the indication of the respective blocking weight).

In this case, the successful completion of the critical test scenario 315*g* is of the utmost importance for the performance of the whole test process. Indeed, should the critical test scenario 315*g* fail (because of an error during its execution) the test scenarios 315*h*,315*i* depending thereon are blocked (since they cannot be reached independently from any other test scenario); in this case, a major part of the test process, i.e., the test scenarios 315*g*,315*h*,315*i* requiring 870 man-hours, cannot be executed until the detected error has been fixed.

From a qualitative analysis of the original activity diagram 300*a*, it is evident that the order of execution of the test scenarios TSa-TSi may impact the performance of the whole test process. For example, let us consider that the test scenarios TSa, TSb and TSc are executed at first, followed by the test scenarios TSd, TSe and TSf; at this point, the test scenario TSg is executed. If an error is now found in the software component under test, the whole test process must be stopped (since the remaining test scenarios TSh,TSi cannot be executed until the test scenario TSg has been successfully completed). In this case, the error in the critical test scenario TSg only appears at least after 1.200 man-hours and it blocks the test process for the whole time required for its fixing (such as one week).

Therefore, the critical test scenario TSg must be reached as soon as possible. For this purpose, it is now possible to define a test plan that arranges the order of execution of the test scenarios TSa-TSi so as to minimize the time required to the reach this critical test scenario TSg.

Figure 3B:
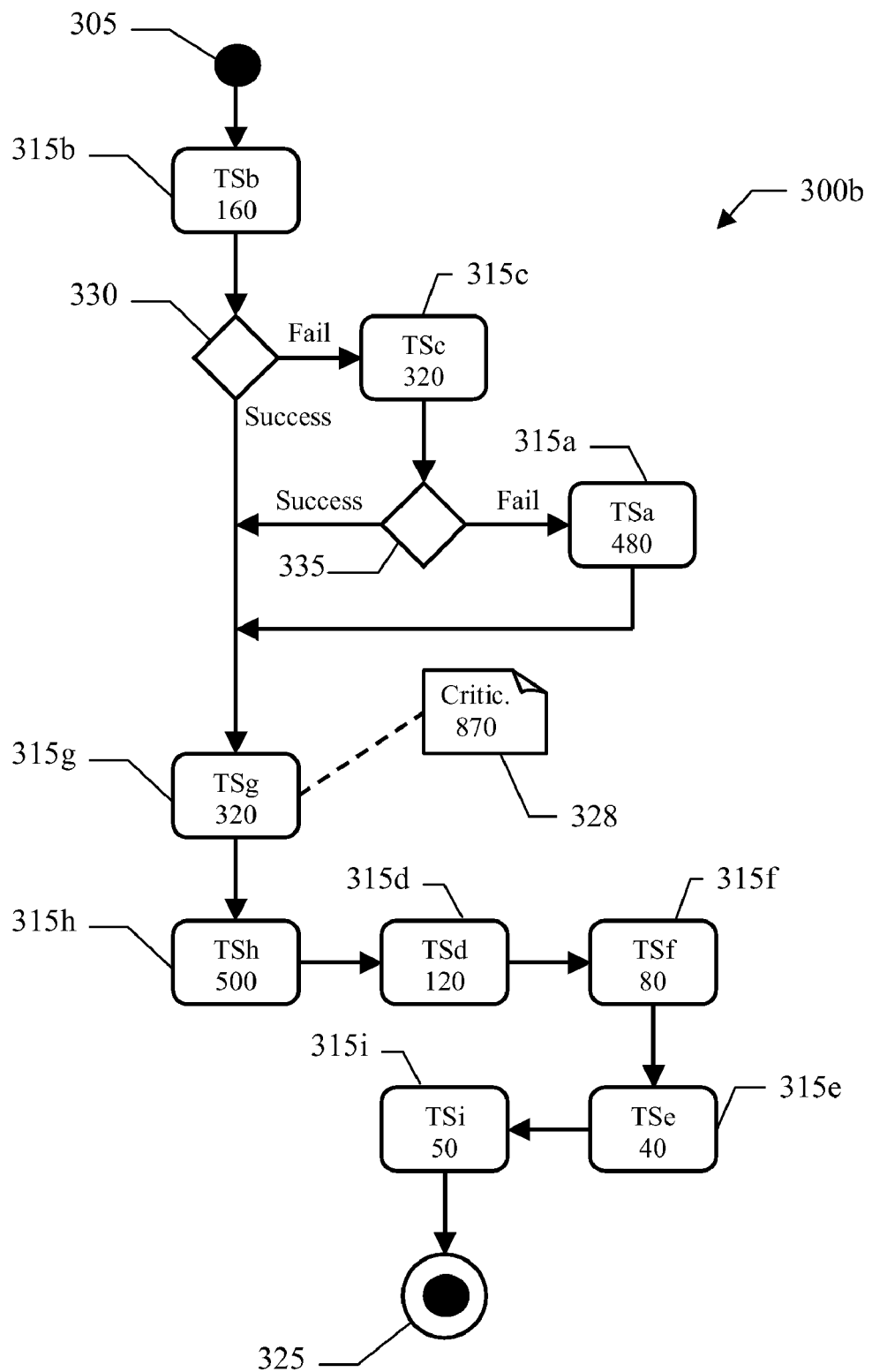

As shown in FIG. 3*b* (to be read together with FIG. 3*a*), this test plan is defined by an (optimized) activity diagram 300*b*. For the sake of simplicity, at first there is taken into account a situation wherein a single resource (such as a human tester) is available for executing the test scenarios. In this case, the optimized activity diagram 300*b* can be built, for example, by analyzing all the execution paths available to reach the critical test scenario TSg (i.e., an execution path P1=305,310,315*a*, an execution path P2=305,310,315*b*, and an execution path P3=305,310,315*c* in the example at issue). For each execution path P1-P3 a corresponding reaching weight is calculated as the sum of the execution weights of the action states along it. In this case, the reaching weights of the execution paths P1-P3 will be:
- P1=480
- P2=160
- P3=320.

The execution paths P1-P3 are arranged along a sequence in decreasing order of their reaching weights:
- P2=160
- P3=320
- P1=480.

The action states only (removing any other graphical elements) of the execution path with the lowest reaching weight are then added to the activity diagram 300*b* (including the initial state 305 at the beginning), by linking them through corresponding transitions. In this case, therefore, the action state 315*b* is added following the initial state 305. The flow of activity then passes from the last action state of the added execution path (i.e., the action state 315*b*) to a new decision point 330. An output transition based on the successful completion of the corresponding test scenario TSb indicates the passage to the action state 315*g* associated with the critical test scenario TSg; instead, another output transition based on the failure of the same test scenario TSb indicates the passage to the next execution path in the sequence (i.e., the execution path P3). The same operation is repeated by adding the action state 315*c* followed by a further new decision point 335, from which the flow of activity passes to the action state 315*g* (when the corresponding test scenario TSc has been successfully completed) or to the next execution path in the sequence otherwise (i.e., the execution path P1). The process is reiterated until the last execution path (the execution path P1 in this case) has been reached; the flow of activity now passes from the last action state of the added execution path (i.e., the action state 315*a*) to the action state 315*g* associated with the critical test scenario TSg unconditionally.

The process continues for the next test scenario with the highest blocking weight that is still to be inserted into the test plan (i.e., the test scenario TSh); in this phase the corresponding action state 315*h* is added following the action state 315*g* (of the preceding critical test scenario TSg). The same operations are reiterated until all the test scenarios TSa-TSi have been added to the test plan; the optimized activity diagram 300*b* is then completed by moving from the last added action state (the action state 315*i* in this case) to the final state 325.

In the test process so obtained, the critical test scenario TSg is executed directly after the test scenario TSb (assuming that it has been successfully completed immediately). Therefore, the error in the critical test scenario TSg now would appear after 160 man-hours (i.e., 1.200−160=1.040 man-hours earlier than in the preceding case). It is then not necessary to stop the test process any longer; indeed, the other test scenarios 315*c* and 315*a* can now be executed (in an attempt to reach the critical test scenario TSg) while the error in the test scenario TSb is being fixed.

The proposed solution strongly facilitates the management of the test process. Indeed, the activities relating to its development, planning, scheduling and reporting may now be (at least partially) automated.

Particularly, the above-described solution strongly facilitates the definition of an execution strategy for the test scenarios, and makes it less dependent on personal skills. Moreover, the obtained documentation is well suited to convey and/or share the desired information; at the same time, it allows performing objective analyses of the test process. The above-mentioned advantages improve the allocation of the available resources (which may now be exploited at their best to ensure an effective execution of the test process).

All of the above reduces the cost and increases the quality of the test process; this fosters the extensive application of the test process, with a beneficial impact on the reliability of the software applications.

Figure 3C:
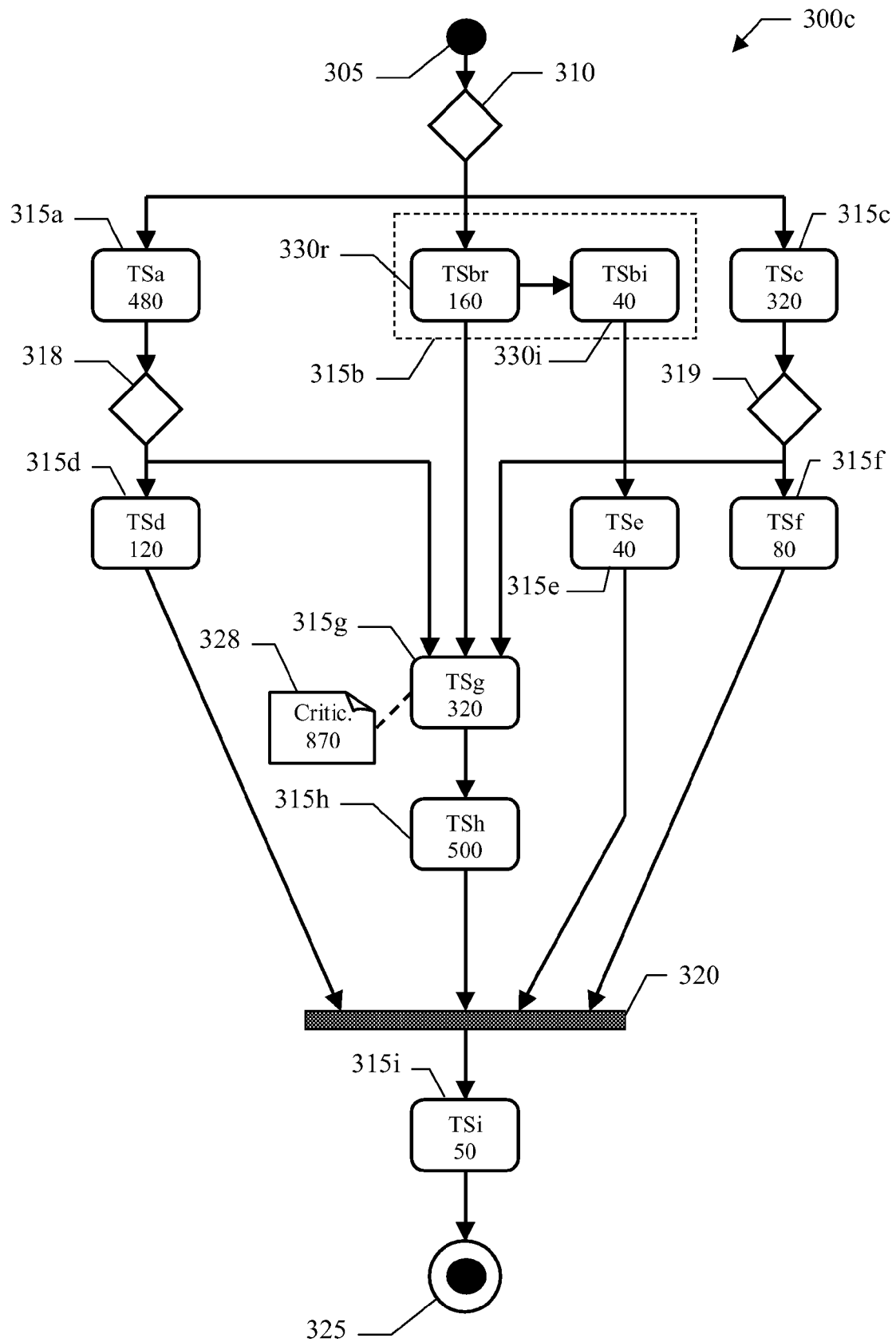

As a further improvement, as shown in FIG. 3*c*, the test process may be refined into a different activity diagram 300*c*. Particularly, it is possible to update the definition of the test scenarios TSa-TSc on which the critical test scenario TSg depends so as to speed up its reaching. For example, the test scenario TSb may be split into two (auxiliary) test scenarios TSbr and TSbi. The test scenario TSbr includes the minimum number of required test cases, which have to be successfully completed to allow moving towards the critical test scenario TSg; on the contrary, the test scenario TSbi includes all the other test cases, which are irrelevant for the reaching of the critical test scenario TSg. The test scenarios TSbr,TSbi have individual lower execution weights (such as 30 and 130, respectively), which sum is equal to the execution weight of the (original) test scenario TSb (i.e., 160). The action state 330*r* replaces the action state 315*b* (between the initial state 305 and the action state 315*g*); the action state 330*i* is instead inserted according to the execution dependencies of the corresponding test scenario TSbi (for example, between the action state 330*r* and the action state 315*e*).

Figure 3D:
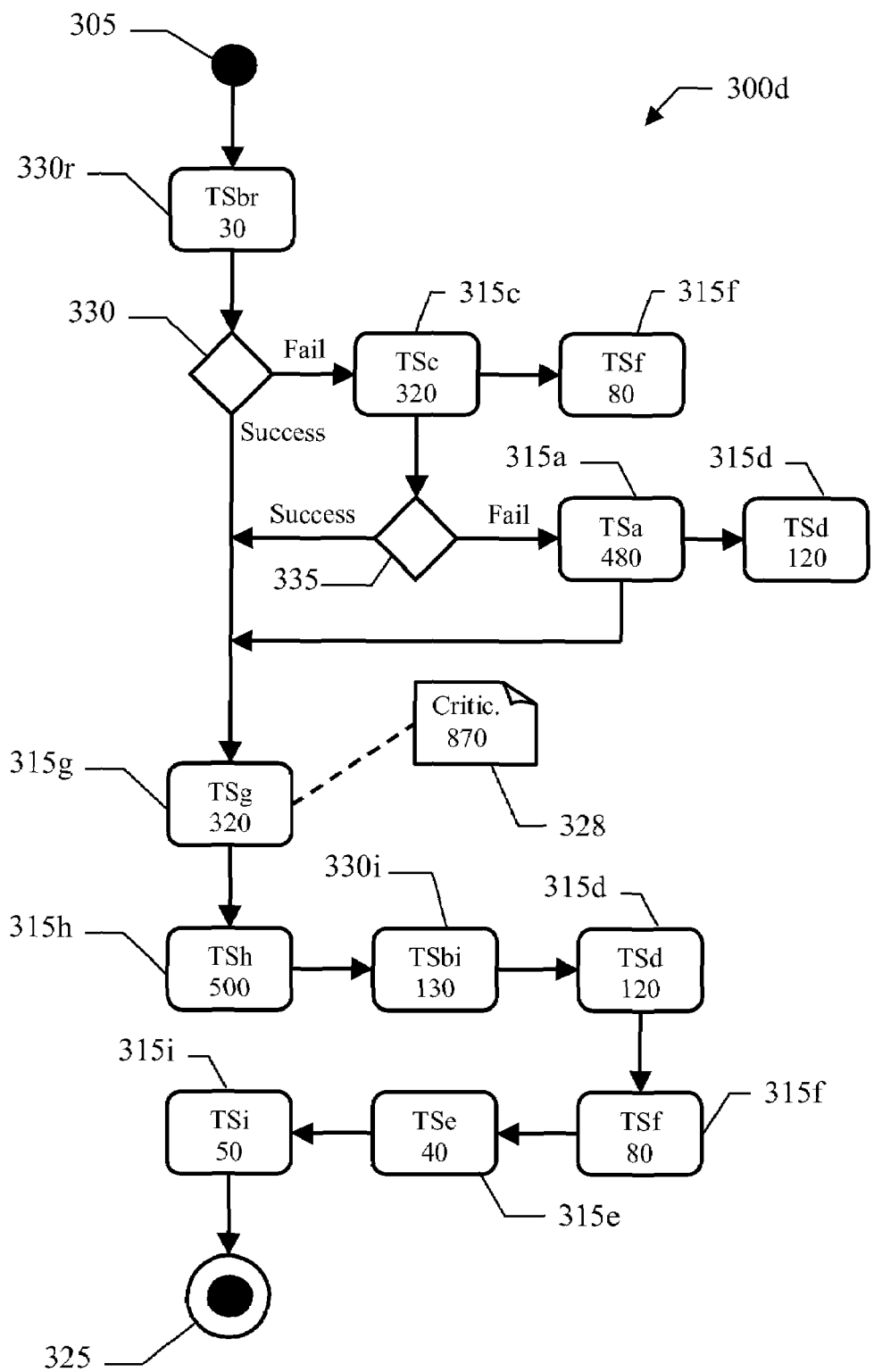

Moving now to FIG. 3*d*, the corresponding test plan is now represented by an optimized activity diagram 300*d*. In this case, the action state 330*r* is arranged along the corresponding execution path P1 (i.e., between the initial state 305 and the decision point 330); the action state 330*i* is instead inserted between the action states 315*h* and 315*d*. Therefore, (assuming that the test scenario TSbr has been successfully completed immediately) the error in the critical test scenario TSg now would appear even earlier (i.e., after 30 man-hours).

Similar considerations apply when two or more testers are available; in this case, multiple concurrent execution branches are defined (by means of corresponding new synchronization points) to optimize the use of all the testers. More generally, the optimized activity diagram representing the test plan is generated so as to minimize the time required to reach the most critical test scenarios, according to the available testers and the execution dependencies (as specified in the original activity diagram).

In a different embodiment of the invention, the test plan is generated assuming that all the test scenarios TSa-TSi will be always successfully completed (i.e., without any decision points in the corresponding optimized activity diagram); in this case, however, the test plan is regenerated dynamically whenever any test scenario TSa-TSi fails.

Figure 3E:
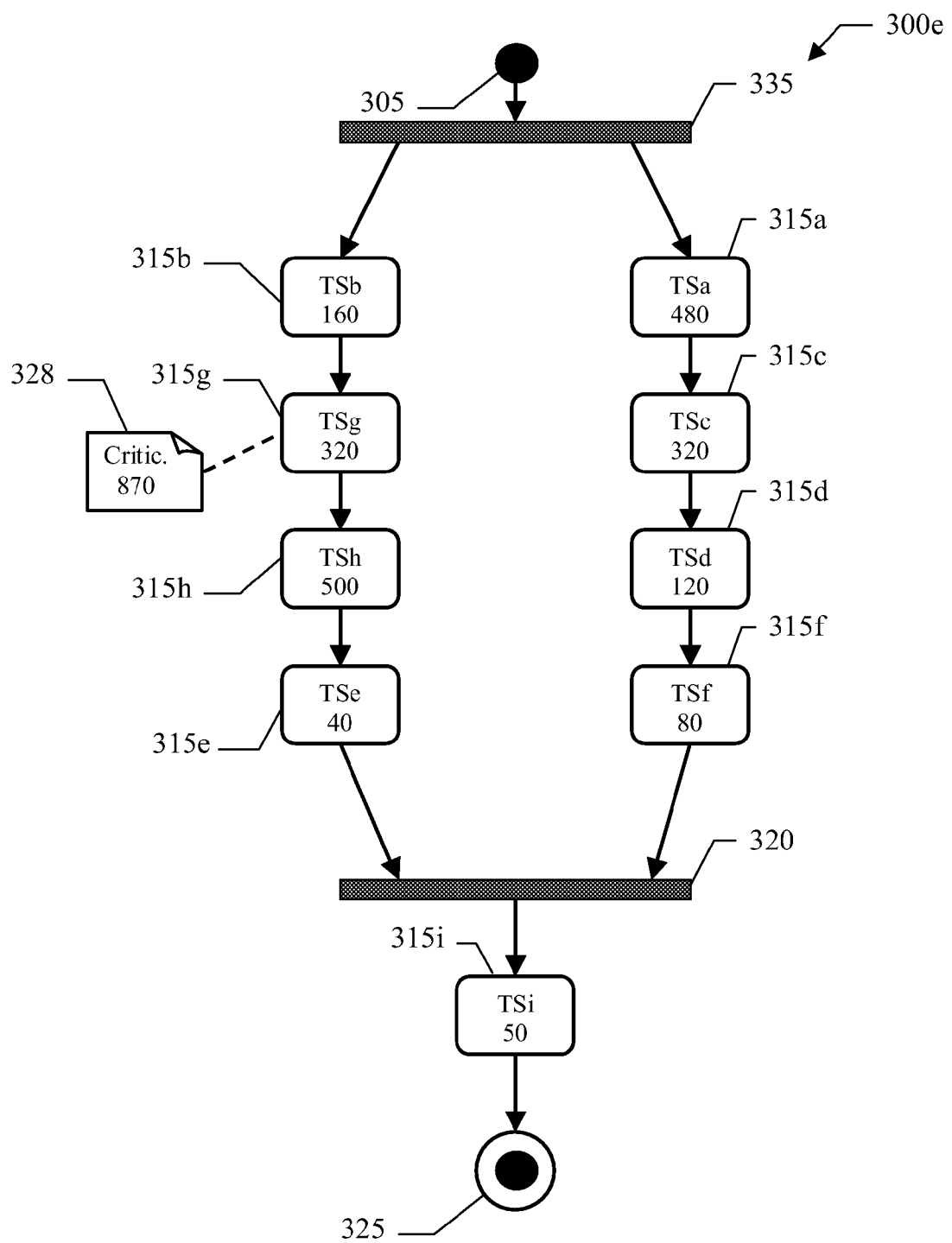

For example, as shown in FIG. 3*e*, an optimized activity diagram 300*e* is generated in an initial condition with two testers (denoted with TST1 and TST2); preferably, a skill weight is associated with each tester TST1 and TST2 to indicate the corresponding experience (such as 80 and 50, respectively, in a scale from 0 to 100). At the beginning, the testers TST1,TST2 are free (so that their workload is equal to 0):

TST1(80)=0
TST2(50)=0

At the same time, all the test scenarios TSa-TSi are still to be executed, so that their status can be indicated as "Open":

TSa=Open
TSb=Open
TSc=Open
TSd=Open
TSe=Open
TSf=Open
TSg=Open
TSh=Open
TSi=Open.

The optimized activity diagram 300*e* is created starting from the initial state 305 followed by a new synchronization point 335, from which an output transition exits for each available tester (so as to define a corresponding branch). The process continues by verifying whether the most critical test scenario TSg can be executed. In this case, the operation is impossible because the test scenario TSg depends on one of the test scenarios TSa, TSb or TSc (still to be executed). Therefore, the test scenario among them with the lowest blocking weight is selected (i.e., the test scenario TSb). The same verification determines that the test scenario TSb instead can be executed (since it does not depend on any other test scenario). Therefore, the test scenarios TSb and TSg are assigned to the tester with the lowest workload, preferring the one with the highest skill weight for the same value (i.e., the tester TST1). As a result, the action states 315*b* and 315*g* are added to the branch of the tester TST1 in succession (with corresponding transitions), and the workload of the testers TST1,TST2 is updated as follow:

TST1=160+320=480
TST2=0

The (next) critical test scenario TSa is now assigned to the other tester TST2 (with the lowest workload); as a result, the corresponding action state 315*a* is added to her/his branch in the optimized activity diagram 300*e*, and the workload of the testers TST1,TST2 becomes:

TST1=480
TST2=480

Considering now the test scenario TSh, it is assigned to the tester TST1 by adding the corresponding action state 315*h* to her/his branch (after the last added action state 315*g*). The same operations are repeated by assigning the test scenario TSc to the tester TST2, the test scenario TSd again to the tester TST2, the test scenario TSe to the tester TST1, and the test scenario TSf to the tester TST2. At this point, the synchronization point 320 is added, followed by the action state 315*i*

(assigned to the tester TST1). The optimized activity diagram is completed by the final state 325 that follows the action state 315i.

In the test plan so obtained, the critical test scenario TSg is executed immediately (after the test scenario TSb) by the most expert tester TST1, who then moves to the test scenarios TSh and TSe. At the same time, the other tester TST2 executes the test scenarios TSa, TSc, TSd and TSf in succession. Once both the testers TST1 and TST2 have reached the synchronization point 320, the tester TST1 can execute the test scenario TSi.

Let us suppose now that the test scenario TSg fails (just after the test scenario TSa has been successfully completed by the tester TST2). In this case, the status of the test scenarios TSa-TSi is:

TSa=Completed
TSb=Completed
TSc=Open
TSd=Open
TSe=Open
TSf=Open
TSg=Blocked
TSh=Open
TSi=Open.

Figure 3F:
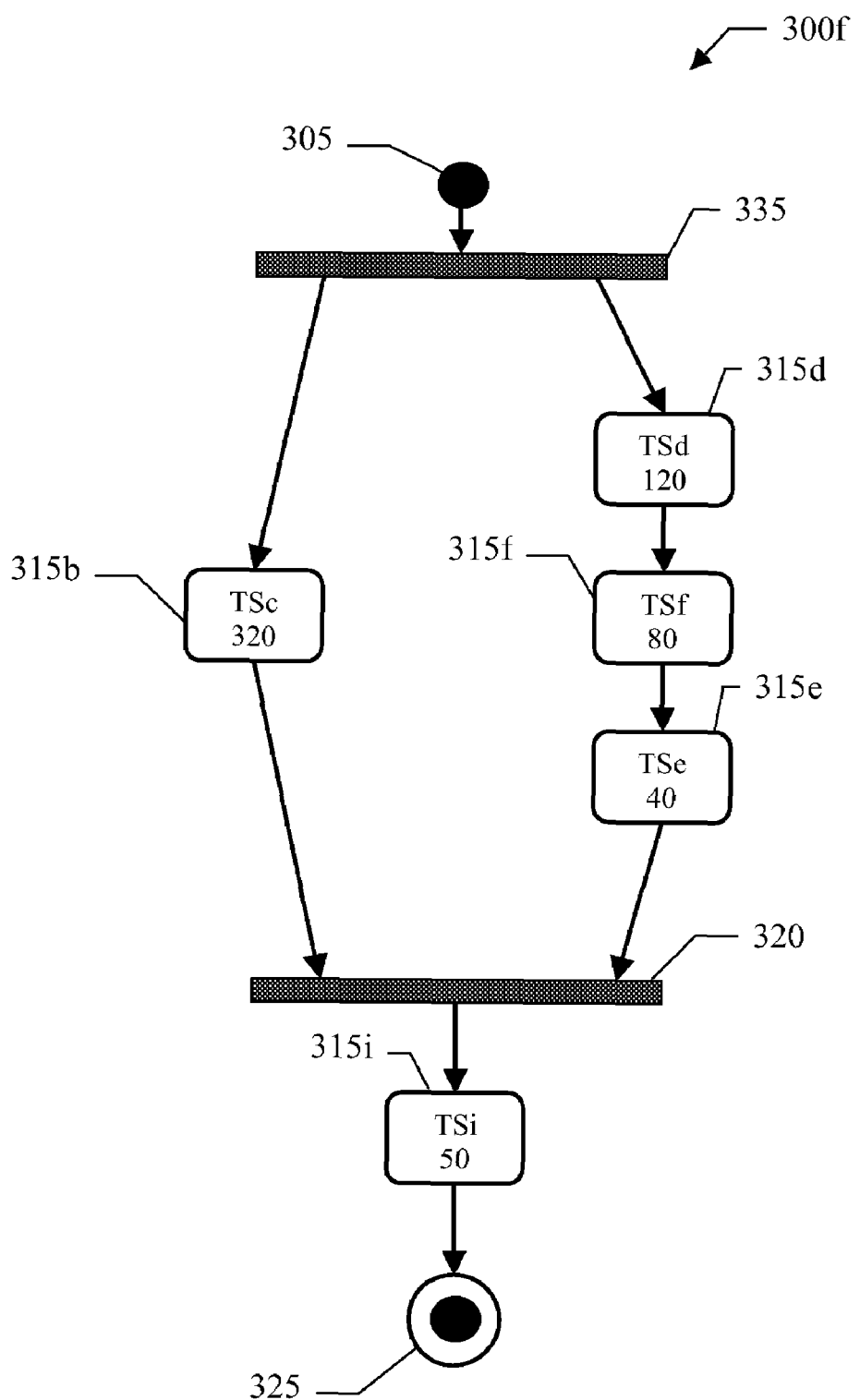

Therefore, as shown in FIG. 3f, a new optimized activity diagram 300f (for the test scenarios still to be executed) is generated according to the updated status of the test scenarios. In this condition, the most critical test scenarios TSg and TSh cannot be executed until the error detected in the test scenario TSg has been fixed. Continuing to the test scenario TSc, it is now assigned to the tester TST1 (by adding the action state 315c in the corresponding branch after the synchronization point 335 following the initial state 305). Reiterating the same operations, the test scenarios TSd, TSf and TSe are now assigned to the tester TST2; the activity diagram 400b is completed by adding the synchronization point 320 followed by the action state 315i (assigned again to the tester TST2) and then the final state 325.

Similar considerations apply when the number of available testers changes (it either increases or decreases). More generally, the optimized activity diagram representing the test plan is generated dynamically whenever any runtime condition that may affect the execution of the test process (such as the available testers and/or the status of the test scenarios) changes; the process is carried out according to the available testers, the execution dependencies (as specified in the original activity diagram), and the status of the test scenarios.

In this way, the test plan self-adapts to the changing runtime conditions; this provides an autonomic approach to the problem of managing the test process.

Figure 4:
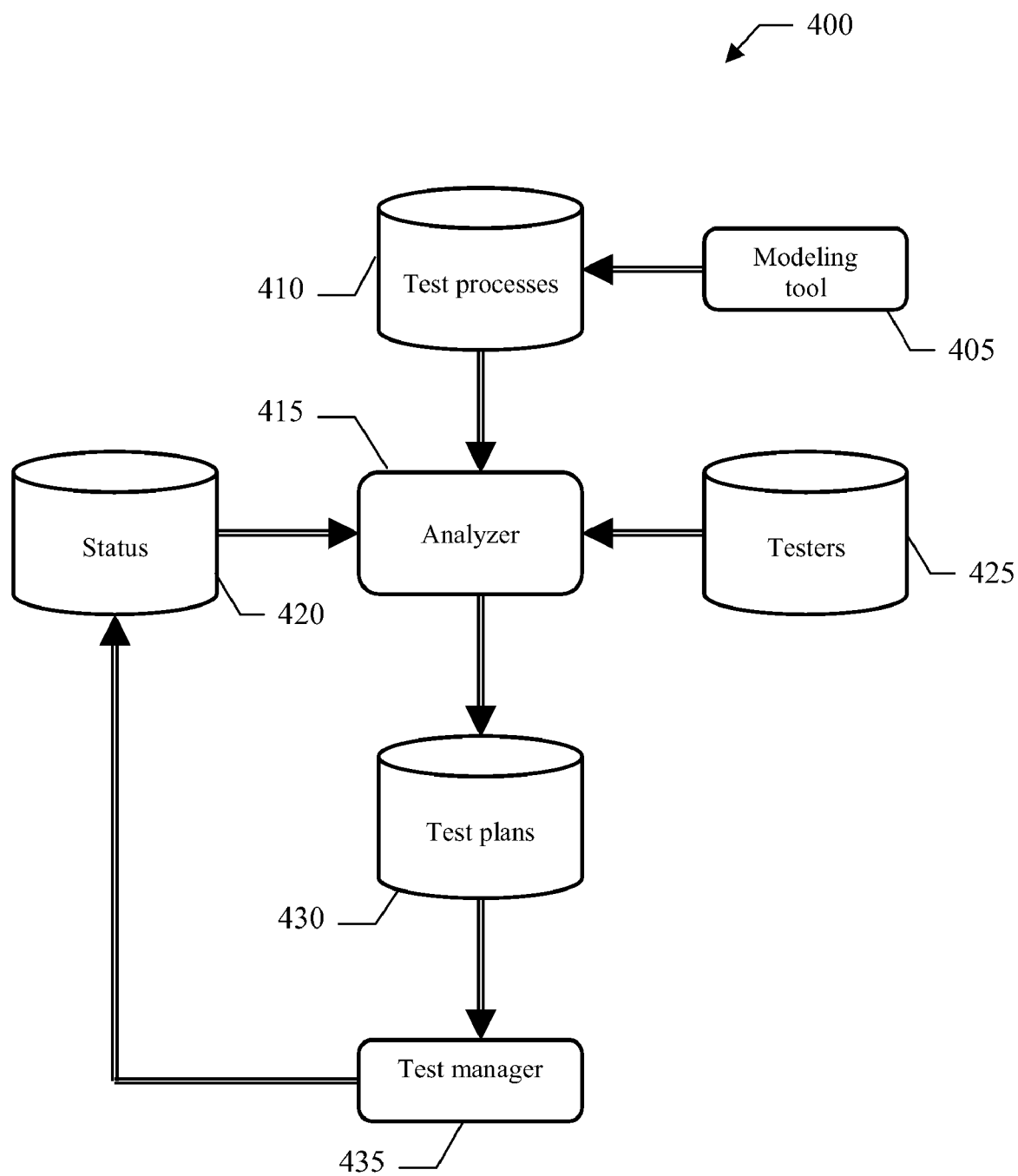
FIG. 4 shows the main software components that can be used to practice the solution according to an embodiment of the invention.

Moving now to FIG. 4, the main software components that run on the above-described computer define a test management suite that is denoted as a whole with the reference 400. The information (programs and data) is typically stored on the hard-disk and loaded (at least partially) into the working memory of the computer when the programs are running, together with an operating system and other application programs (not shown in the figure). The programs are initially installed onto the hard disk, for example, from CD-ROM.

Particularly, a (standard) modeling tool 405 is used to define the different test processes under management with the corresponding original activity diagrams; particularly, the modeling tool 405 provides a graphical user interface that allows creating, editing, viewing, and performing any other management operations on the original activity diagrams. An example of commercial modeling tool 405 that is well suited for this purpose is the "Rational Rose" by IBM Corporation. The definitions of the original activity diagrams representing the different test processes are stored into a repository 410, for example, by means of corresponding definition files in the XML Metadata Interchange (XMI) format.

An analyzer 415 accesses the repository 410 and two further repositories 420 and 425. For each test process, the repository 420 stores the status of the corresponding test scenarios; on the other hand, the repository 425 stores information about the available testers (such as their skill weights and workloads). Once a desired test process has been selected, the analyzer 415 retrieves the definition of its original activity diagram (from the repository 410); at the same time, the analyzer 415 retrieves the status of the corresponding test scenarios (from the repository 420) and the information about the available testers (from the repository 425). Accordingly, the analyzer 415 generates the optimized activity diagram representing the desired test plan (so as to minimize the time required to reach its critical test scenarios). The definitions of the optimized activity diagrams so obtained are stored into corresponding definition files 430 (always in the XMI format).

The definition file 430 of a selected optimized activity diagram is supplied to a test manager 435. The test manager controls all the operations relating to the execution of the selected test process (according to its test plan). Whenever a runtime condition changes, the test manager 435 stops the execution of the test process, and updates the content of the repository 420 (for the status of the test scenarios) and/or of the repository 425 (for the testers). As a consequence, the analyzer 415 generates a new optimized activity diagram (for another test plan taking into account the changed runtime conditions); the definition of the new optimized activity diagram replaces the previous version in the corresponding definition file 430.

Figure 5A:
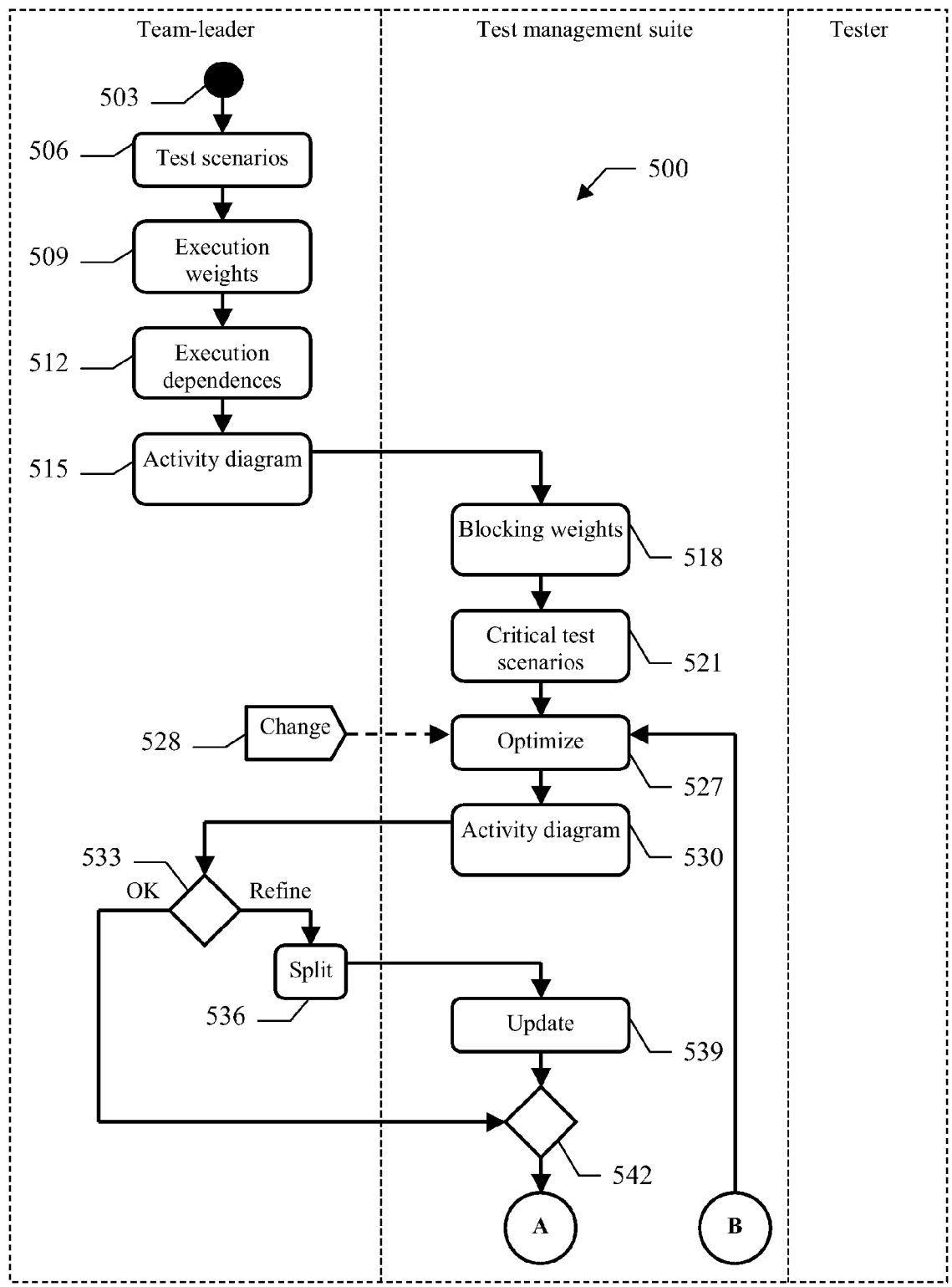
FIGS. 5*a*-5*b* illustrate a diagram describing the flow of activities relating to an implementation of the solution according to an embodiment of the invention.
Figure 5B:
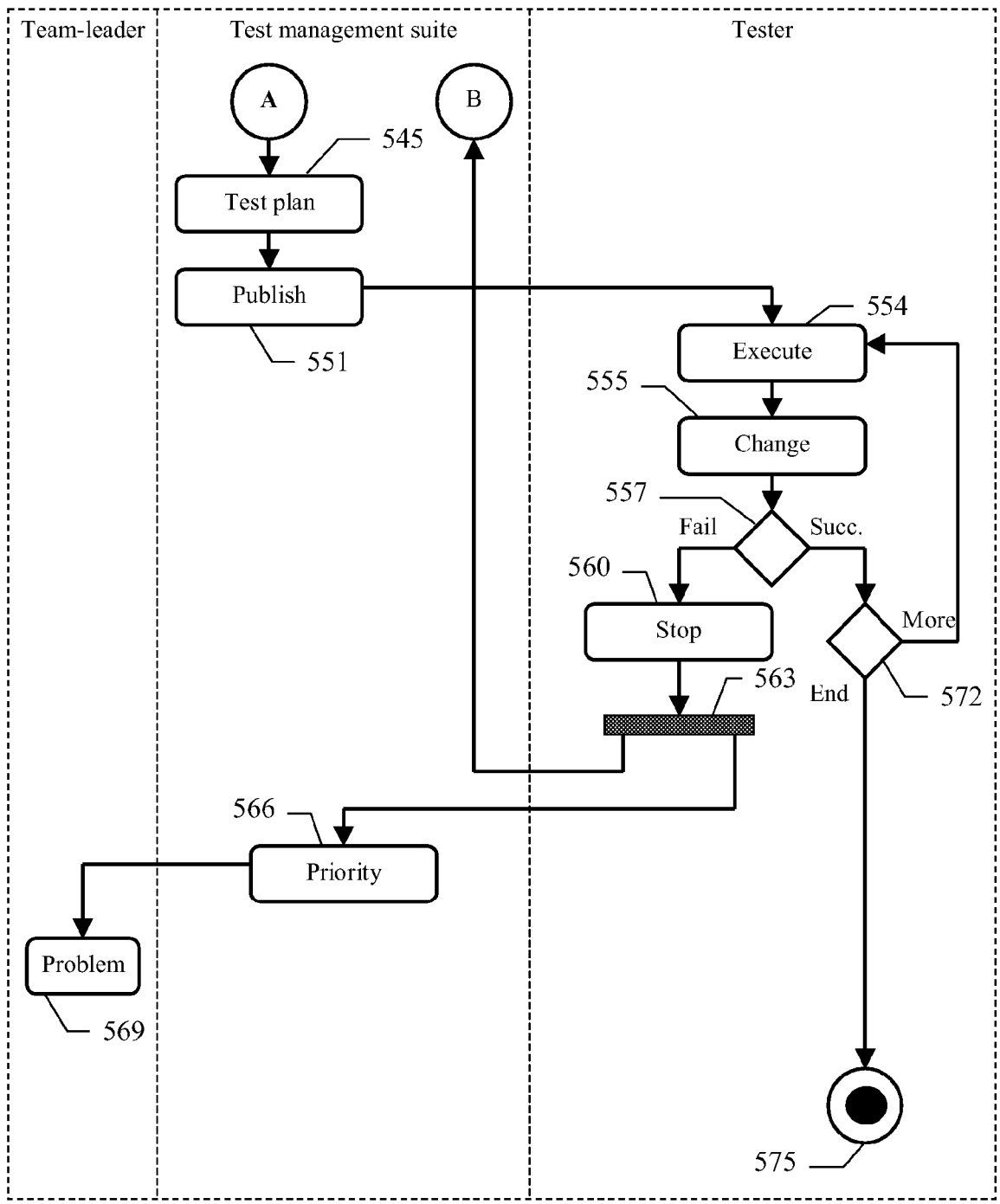

More in detail, as shown in FIGS. 5a-5b, the logic flow of an exemplary test process that can be implemented in the above-described system is represented with a method 500. The method 500 begins at the initial state 503 in the swim-lane of a manager (such as a team-leader) in change of a generic test process.

Continuing to the action state 506, the team-leader defines the scenarios of the test process; for this purpose, the team-leader assigns a label to each scenario and specifies the test cases that should be executed to verify the desired feature of the software component under test. The team-leader then sets the execution weight of each test scenario at the action state 509. This operation may be performed by estimating the time required to execute the test scenario (according to its complexity); alternatively, it is also possible to calculate the execution weight automatically according to the number of test cases. The method 500 now proceeds to the action state 512, wherein the team-leader identifies the constraints (i.e., the dependencies and/or the alternatives) that apply to the execution of the test scenarios. The above-mentioned operations generate the original activity diagram that represents the test process (action state 515); typically, the desired result is achieved with an iterative process based on continual interactions with a development architect of the software application to be tested.

Moving now to the swim-lane of the test management suite, the blocking weights of the test scenarios are calculated at the action state 518. The method 500 then descends into the action state 521, wherein the test management suite identifies the critical test scenarios (having the highest blocking weights). A test plan is now generated at the action state 527 arranging the order of execution of the test scenarios (by the available testers) so as to minimize the time required to reach the critical test scenarios. The same point is also reached from block 528 in response to any change in the available testers (under the control of the team-leader) or in the status of the test scenarios due to the fixing of any error (under the control of the development architect); in this case, all the testers are also notified not to start the execution of any new test scenario until the new test plan is available (in any case, allowing them to complete the test scenarios in progress). In any case, the operation results in the generation of the optimized activity diagram that represents the test plan (action state 530).

The flow of activity now branches at the decision point 533 in the swim-lane of the team-leader. If the team-leader wishes to refine the test plan, the method 500 descends into the action state 536; in this phase, the team-leader can decide to split one or more test scenarios (on which the critical test scenarios depend) so as to further reduce the time required to reach them. The optimized activity diagram is then updated at the action state 539 (in the swim-lane of the test management suite) according to the new definition of the test process. The flow of activity merges at the decision point 542 (from the action state 539 or from the decision point 533 directly when the team-leader accepts the proposed arrangement of the test scenarios).

In any case, the definition file of the desired test plan is generated automatically at the action state 545. The team-leader now requires the test management suite at the action state 551 to generate a definition document of the test plan; this definition document (for example, in the PDF or HTML format) is created automatically from the definition file of the test plan. At the same time, the definition document is published (such as onto a web site) for its access by any authorized persons (for example, the team-leader herself/himself, the development architect, the testers, and the like).

Moving now to the action state 554 in the swim-lane of a generic tester, s/he begins executing an assigned test scenario, starting from the first on (as indicated in the definition document). Once the execution of the (current) test scenario ends (because either it is has been successfully completed or it has failed), the method 500 proceeds to the action state 555; in this phase, the tester updates the status of the test scenario accordingly into the corresponding repository.

The flow of activity now branches at the decision point 557 according to the result of the test scenario. If the test scenario has failed (because an error has been detected in the software component under test), the other testers are notified not to start the execution of any new test scenario until the new test plan is available. The method 500 then forks at the synchronization point 563 into two branches that are executed concurrently. Particularly, the method 500 returns to the actions state 527 to generate a new optimized activity diagram (according to the changed runtime conditions). At the same time, at the action state 566 the test management suite automatically determines a priority for fixing the error according to the blocking weight of the failed test scenario. Continuing to the action state 569, the team-leader is notified of the error (with the corresponding fixing priority); the team-leader then opens a development problem for the error (specifying the associated fixing priority). In this way, the development architect is immediately informed of the criticality of the error, so as to assign the required resources (such as developers) to the problem.

Referring back to the decision point 557, when the test scenario has been successfully completed, a new decision point 572 is reached. If the tester has to execute further test scenarios (as indicated in the definition document), the flow of activity returns to the action state 554 to reiterate the process. On the contrary, as soon as all the test scenarios assigned to the tester have been successfully completed, the method 500 ends at the final state 575.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has another structure or includes similar elements (such as a cache memory temporarily storing the programs or parts thereof to reduce the accesses to the hard disk during execution); in any case, it is possible to replace the computer with any code execution entity (such as a PDA, a mobile phone, and the like). Although in the preceding description reference has been made to a single computer for the sake of simplicity, it should be readily apparent that the proposed solution is typically applied in a data processing system with distributed architecture (for example, with web architecture); in this case, each person (such as the development architect, the team-leader, and the testers) works on a corresponding workstation, with the obtained results that are collected on a central server for different purposes.

Moreover, it should be readily apparent that the term test scenario as used herein is not limited to the described examples and it may indicate any other basic activity which concurs to the definition of the whole test process (such as a complex story covering multiple test operations).

The principles of the invention are also applicable when other resources available for the execution of the test scenarios are taken into account (for example, groups of testers each one suitable to work on a single test scenario at the time, hardware and/or software components, and the like).

In any case, the definition of different execution dependencies among the test scenarios may be supported (for example, with more complex rules such as based on time constraints).

Similar considerations apply if the critical test scenarios are defined in any equivalent manner; moreover, it is possible to implement any other optimization algorithms for generating the test plan, so as to minimize a generic cost function (such as the time, the expenses, the resources, and the like) for the reaching of the critical test scenarios.

It should be readily apparent that the runtime conditions described in the foregoing are merely illustrative, and they are not to be interpreted in a limitative manner; for example, in a different embodiment of the invention it is possible to take into account a priority of the test scenarios, new execution dependencies among the test scenarios, and the like.

Alternatively, the execution weight of each test scenario may be defined in a different way (for example, according to a monetary cost required by its execution). In a simplified embodiment of the invention it is also possible to avoid assigning any execution weights to the test scenarios. In this case, the critical scenarios are identified simply according to the number of test scenarios that depend exclusively on them; on the other hand, the order of execution of the test scenarios is arranged so as to minimize the number of test scenarios required to reach the critical test scenarios.

Likewise, the same results may also be achieved with any other graphical representation of the test process and/or of the test plan (such as with multiple transitions coming out from any action state); however, nothing prevents the definition of the test process with different techniques (even not of the graphical type).

Anyway, the reference to the UML language must not be interpreted in a limitative manner (with the proposed solution that may also be implemented with different formalisms, such a based on Petri networks).

As described above, the proposed solution has been specifically designed for a test process at the component level; however, the concepts of the present invention are also applicable to other test processes, even intended to verify any other product (such as hardware systems, electronic components, and the like); for example, the same solution may be applied to a test process at the system level (also known as System Verification Test, or SVT), even if in this case an extra effort is required to identify the dependencies among the test scenarios.

Alternatively, the fixing priority of any error may be simply defined by the number of test scenarios that are blocked. Moreover, the assignment of the fixing priority to the error may also be performed manually (in this case as well with the aid of the optimized activity diagram).

In any case, the solution according to the present invention lends itself to be used for managing any other activities, such as in project management applications. More generally, a different embodiment of the invention provides a method for facilitating the management of a plurality of activities, wherein predefined resources are available for executing the activities; the method includes the steps of: defining execution dependencies among the activities based on successful completion thereof, determining a blocking weight of each activity according to the activities depending thereon, identifying a set of critical activities having the highest blocking weights, and generating an execution plan by arranging the order of execution of the activities by the available resources to minimize a cost function for the reaching of the critical activities according to the available resources and the execution dependencies.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for facilitating the management of a test process including a plurality of test scenarios, wherein predefined resources are available for executing the test scenarios, the method including the steps of:
   defining execution dependencies among the test scenarios based on successful completion thereof,
   determining a blocking weight of each test scenario according to the test scenarios depending thereon,
   identifying a set of critical test scenarios having the highest blocking weights,
   generating a test plan by arranging the order of execution of the test scenarios by the available resources to minimize a cost function for the reaching of the critical test scenarios according to the available resources and the execution dependencies, and
   causing the execution of the test scenarios by the available resources according to the test plan.

2. The method according to claim 1, further including the steps of:
   detecting a change in runtime conditions affecting the execution of the test scenarios, and
   generating a new test plan in response to the change, each test plan being generated further according to the runtime conditions.

3. The method according to claim 2, wherein the runtime conditions include a status of the test scenarios.

4. The method according to claim 1, wherein the cost function is indicative of the time required to reach the critical test scenarios.

5. The method according to claim 1, further including the step of:
   associating an execution weight with each test scenario, each execution plan being generated further according to the execution weights.

6. The method according to claim 1, wherein the step of defining the execution dependencies includes:
   representing each test scenario with a node element of a diagram,
   representing each execution dependency of a single type, wherein the execution of a first target test scenario depends on the successful completion of a single first source test scenario, with a first arc from the node element of the first source test scenario to the node element of the first target test scenario,
   representing each execution dependency of a multiple type, wherein the execution of a second target test scenario depends on the successful completion of a plurality of second source test scenarios, with a second arc from the node element of each second source test scenario to a synchronization element and a further second arc from the synchronization element to the node element of the second target test scenario, and
   representing each alternative, wherein a plurality of target elements are suitable to be reached from at least one source element, with a fourth arc from each source element to a branch element and a further fourth arc from the branch element to each target element.

7. The method according to claim 6, wherein the diagram is a UML activity diagram, each node element being an action state, each arc being a transition, each synchronization element being a synchronization point, and each branch element being a decision point.

8. The method according to claim 1, further including the steps of:
   detecting an execution error causing the non-successful completion of a failed test scenario, and
   assigning a priority for the fixing of the execution error according to the blocking weight of the failed test scenario.

9. A computer program in a computer readable medium for facilitating the management of a test process including a plurality of test scenarios, wherein predefined resources are available for executing the test scenarios, comprising:
- instructions for defining execution dependencies among the test scenarios based on successful completion thereof,
- instructions for determining a blocking weight of each test scenario according to the test scenarios for depending thereon,
- instructions for identifying a set of critical test scenarios having the highest blocking weights,
- instructions for generating a test plan by arranging the order of execution of the test scenarios by the available resources to minimize a cost function for the reaching of the critical test scenarios according to the available resources and the execution dependencies, and
- causing the execution of the test scenarios by the available resources according to the test plan.

10. A system for facilitating the management of a test process including a plurality of test scenarios, wherein predefined resources are available for executing the test scenarios, comprising:
- means for defining execution dependencies among the test scenarios based on successful completion thereof,
- means for determining a blocking weight of each test scenario according to the test scenarios depending thereon,
- means for identifying a set of critical test scenarios having the highest blocking weights,
- means for generating a test plan by arranging the order of execution of the test scenarios by the available resources to minimize a cost function for the reaching of the critical test scenarios according to the available resources and the execution dependencies, and
- means for causing the execution of the test scenarios by the available resources according to the test plan.

* * * * *